Jan. 30, 1923. 1,443,929.
C. REUSSER.
ANIMAL TRAP.
FILED FEB. 4, 1922.

Inventor:
Christian Reusser

Patented Jan. 30, 1923.

1,443,929

UNITED STATES PATENT OFFICE.

CHRISTIAN REUSSER, OF GUT BORNICKE, NEAR BERNAU, GERMANY.

ANIMAL TRAP.

Application filed February 4, 1922. Serial No. 534,268.

*To all whom it may concern:*

Be it known that I, CHRISTIAN REUSSER, a citizen of Switzerland, and residing at Gut Bornicke, near Bernau, Germany, have invented certain new and useful Improvements in Animal Traps (for which I have filed application in Germany, May 24th, 1921), of which the following is a specification.

This invention relates to an improved animal trap, which essentially comprises a short rod forming a wood-screw at its rear end and having barbs at its front end, so that the trap can be screwed into the trunk of a tree at a certain height thereof, with the barbed projecting ends in upwardly inclined direction, while a bait is put upon the barbs in such a way that the projecting part of the trap is entirely covered by the same, so that the trap itself cannot be perceived by the animal to be caught like a fish by a fish-hook.

The accompanying drawing shows a constructional form of the improved animal trap.

Figure 1:
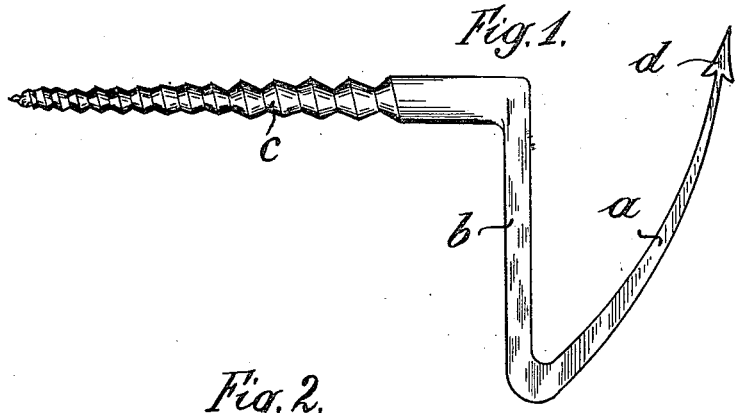
Figure 2:
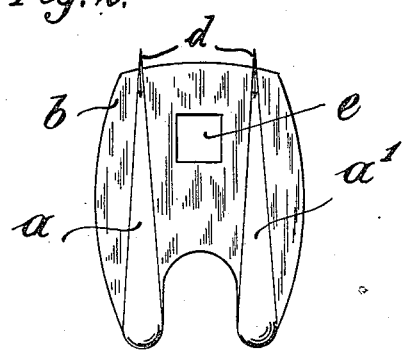

Figs. 1 and 2 are respectively a side view and a front view of the same.

The trap comprises a horizontal straight rear part $c$ forming a wood-screw, a plate-like rectangularly bent downward extension $b$ on the front end of said rear part, and two parallel front parts $a$ and $a^1$ issuing in upwardly inclined direction from said extension $b$ and having each a barbed extremity $d$.

The front end of the straight rear part $c$ is preferably hollow and provided with a square cavity $e$, to which a square instrument can be applied for screwing the trap into the trunk of a tree.

What I claim, is:

An animal trap comprising a horizontal straight rear part forming a wood-screw and having a square cavity in its front end, a plate-like rectangularly bent downward extension on the front end of said rear part, two parallel front parts issuing in upwardly inclined direction from said extension, and a barbed extremity on each front part, substantially as set forth.

In testimony whereof I have hereunto set my hand in the presence of two subscribing witnesses.

CHRISTIAN REUSSER. [L. S.]

Witnesses:
KURT LEUNE,
E. HOLDZERMAN.